United States Patent [19]
Williams

[11] Patent Number: 5,436,615
[45] Date of Patent: Jul. 25, 1995

[54] OVERFLOW DETECTION SYSTEM

[75] Inventor: Paul J. Williams, Franklin Township, Ohio

[73] Assignee: The Babcock & Wilcox Company, New Orleans, La.

[21] Appl. No.: 161,108

[22] Filed: Dec. 2, 1993

[51] Int. Cl.$^6$ .............................................. G08B 21/00
[52] U.S. Cl. ..................................................... 340/616
[58] Field of Search ................... 73/865.8, 149, 290 R; 137/551, 558; 340/616, 618

[56] References Cited

U.S. PATENT DOCUMENTS

| | | | |
|---|---|---|---|
| 3,857,350 | 12/1974 | Rohan | 137/558 |
| 4,292,909 | 10/1981 | Conway | 137/575 |
| 5,028,910 | 7/1991 | Meacham et al. | 340/616 |
| 5,223,819 | 6/1993 | Marsh et al. | 340/617 |

*Primary Examiner*—Hezron E. Williams
*Assistant Examiner*—Nashmiya Ashraf
*Attorney, Agent, or Firm*—Robert J. Edwards; Eric Marich

[57] ABSTRACT

A system for detecting an overflow from a storage tank holding a liquid and/or slurry. An inlet to an overflow box communicates with the tank at an overflow point and receives any overflow from the tank. A main drain pipe communicates with the overflow box and leads to a drain. An overflow discharge pipe having a smaller internal diameter than that of the main drain pipe also communicates with the overflow box, but is located closer to the inlet than the main drain pipe. The overflow discharge pipe provides a first drainage of any overflow from the tank to the main drain pipe, and is provided with a sensor for detecting and/or measuring a flow rate of any overflow through the overflow discharge pipe. A controller provides a signal to activate an alarm in order to alert an operator that an overflow condition exists. Alternatively, the signal could be used to control a flow rate of liquid or slurry into the tank by providing a signal to a flow rate controller to reduce the flow rate of liquid or semi-liquid into the tank whenever any overflow is detected within the overflow discharge pipe by the sensor.

6 Claims, 1 Drawing Sheet

OVERFLOW DETECTION SYSTEM

FIELD AND BACKGROUND OF THE INVENTION

The present invention relates, in general, to the storage of liquids and, in particular, to a new and useful system for detecting the overflow of liquid and/or slurry contents from a storage tank.

It is common practice to store liquids and semi-liquids such as slurries in storage tanks. In many cases, these storage tanks continously receive a flow of the liquid and/or slurry which subjects the tanks to possible inflow and outflow inbalances which can result in the liquid and/or slurry overflowing from the tanks. In response to the overflow problem, overflow systems having overflow boxes, pipes or launders are often used in conjunction with the storage tanks to contain the overflow. These overflow systems must be capable of handling any expected overflow rate that is likely to be encountered. However, in many instances, detecting the beginning of an overflow condition is difficult if not impossible due to the size of the overflow boxes and associated piping provided. Normally, the size of these discharge systems prevents the overflow from completely filling the overflow area (unless the rate of overflow is quite large), precluding a positive measurement of the overflow.

Because of the inability to detect and/or measure the size of the overflow, sensors and transmitters have been provided within the tanks at a high tank level in order to indicate an upcoming overflow in the tank. However, these in-tank devices have generally proven to be unreliable due to various factors such as errors in level indication, errors in the alarm systems used, pluggage of the sensors, poor calibration of the devices, and/or changes in liquid/slurry densities, etc. Therefore, it is quite common that a high tank level of liquid and/or slurry may not be indicated or alarmed to an operator prior to an overflow.

Accordingly a need exists for a system for alerting an operator at an early stage of a tank overflow situation by positive detection of the actual overflow.

SUMMARY OF THE INVENTION

The present invention relates to the detection of the overflow of liquid and/or slurry content from a storage tank, and provides an overflow detection system which maintains sufficient overflow discharge capacity from the storage tank while providing a system in which early detection of an overflow situation is possible. The present invention provides for the positive detection and indication of an overflow from a storage tank and eliminates the need for secondary devices and indicators provided within such storage tanks that are currently used to detect an overflow condition.

One aspect of the present invention is drawn to a system for detecting an overflow of liquid or semi-liquid from a tank. It comprises a tank for holding a liquid or a semi-liquid therein. The tank has an overflow point. An overflow box communicates with the tank at the overflow point and receives any overflow of liquid or semi-liquid from the tank. The box and the tank at the overflow point define an inlet which permits the overflow to enter the box. A main drain pipe communicates with the overflow box and permits overflow to drain from the box. The main drain pipe is connected to the overflow box at a first distance away from the inlet. An overflow discharge pipe also communicates with the overflow box and the main drain pipe, but the overflow discharge pipe is connected to the overflow box at a second distance away from the inlet such that it is closer to the inlet than the main drain pipe. This location allows the overflow discharge line to first receive an overflow of liquid or semi-liquid from the tank before the overflow reaches the main drain pipe at its connection to the overflow box. The overflow discharge pipe is also connected to the main drain pipe and channels any overflow flowing therethrough to the main drain pipe. Finally, sensor means are located on the overflow discharge pipe to detecting any overflow that is channeled therethrough to the main drain pipe.

The present invention thus provides an overflow detection system for storage tanks which provides a positive detection of an overflow which is more cost efficient than known systems and methods and which provides for greater environmental protection over these known systems and methods.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
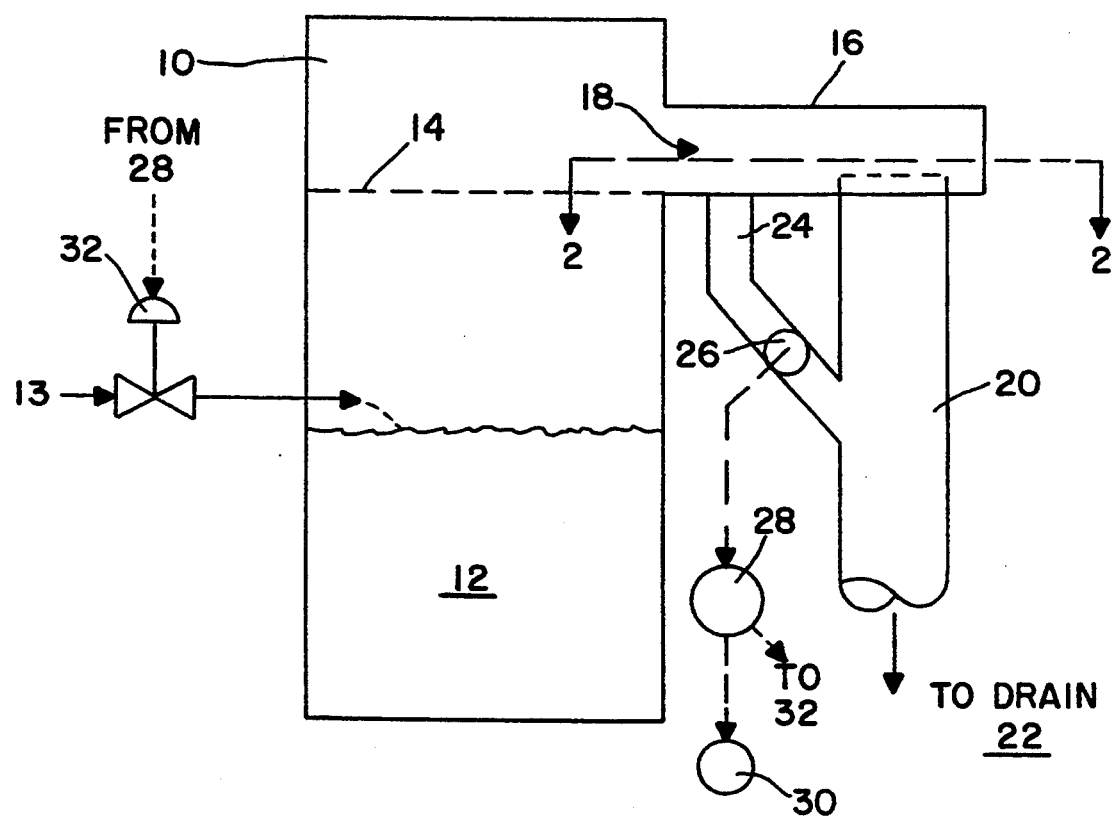
FIG. 1 is a schematic view of a storage tank utilizing the present invention.

As shown in FIG. 1, the present invention provides an overflow system for a tank 10 having a liquid or semi-liquid, (i.e., a slurry) therein, which will be generally referred to as liquid/slurry 12, contained within tank 10. Tank 10 receives the liquid/slurry 12 from a source, generally referred to as 13, and has an overflow point 14, indicated by a dashed line, at which an overflow of the liquid/slurry 12 occurs.

Figure 2:
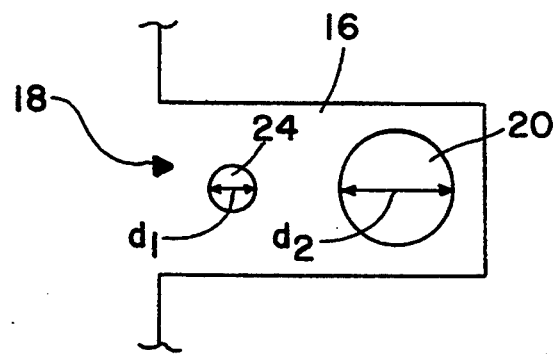
FIG. 2 is a top view in section of a portion of FIG. 2.

According to the present invention, the overflow system comprises an overflow box, pipe or launder, schematically shown at 16, which communicates with tank 10 via inlet 18 at the overflow point 14. Inlet 18 permits an overflow of liquid/slurry 12 from the tank 10 to enter the overflow system 16. A main drain pipe 20 communicates with the overflow box 16 for channeling any overflow to a drain 22. An overflow discharge line or pipe 24 communicates with the overflow box 16 and the main drain pipe 20 and is located near the inlet 18 to provide a first drainage of the overflow from the tank 10 into the main drain pipe 20 as shown in FIG. 2. This is because overflow discharge line 24 is located at a distance closer to the inlet 18 than the distance between the main drain pipe 20 from the inlet 18. Further, the overflow discharge line 24 has an internal diameter d which is smaller than an internal diameter $d_2$ of the main drain pipe 20. This facilitates any overflow conveyed through overflow discharge line 24, even if it is a small flow rate, occupying a significant portion of the flow area in overflow discharge line 24, allowing flow sensor means 26 associated therewith to accurately detect and/or measure any overflow of liquid/slurry 12. Sensor means 26 are located on overflow discharge line 24 and may comprise any known type of flow sensor such as a conductivity sensor or a paddle wheel-type flow switch. The sensor means 26 communicates with a controller 28 having an alarm 30. Sensor means 26 transmits a signal to controller 28 indicating detection of an overflow in overflow discharge line 24 Controller 28 then triggers alarm 30 to provide an indication to an operator that an overflow has occured. Controller 28 could also provide a signal to actuate valve means, schematically shown at 32 in FIG. 1, to reduce or stop flow from source 13 into tank 10.

The present invention provides an early, positive indication of an overflow condition occurring within tank 10 to alert an operator and allow for manual or automatic correction thereof. By providing the separate, small diameter overflow discharge line 24 and its associated sensor means 26 at a location closer to the inlet of the overflow box 16 than the main drain pipe 20, a more reliable overflow alarm is available for use by the operator. The present invention alleviates problems normally associated with known secondary signal devices and instruments.

While specific embodiments of the invention have been shown and described in detail to illustrate the application of the principles of the invention, it will be understood that the invention may be embodied otherwise without departing from such principles.

I claim:

1. A system for detecting an overflow of liquid or semi-liquid from a tank which maintains sufficient overflow discharge capacity from the tank while providing early detection of an overflow, comprising:

a tank for holding a liquid or a semi-liquid therein, the tank having an overflow point;

an overflow box communicating with the tank at the overflow point for receiving an overflow of the liquid or semi-liquid, the box and the tank at the overflow point defining an inlet for permitting the overflow to enter the box;

a main drain pipe communicating with the overflow box for permitting the overflow to drain from the box, the main drain pipe being connected directly to the overflow box at a first distance away from the inlet;

an overflow discharge pipe communicating with the overflow box and the main drain pipe, the overflow discharge pipe being connected directly to the overflow box at a second distance away from the inlet such that the discharge pipe is connected to the overflow box at a point closer to the inlet than the main drain pipe, for first receiving the overflow of liquid or semi-liquid from the tank before the overflow reaches the main drain pipe at the main drain pipe connection to the overflow box, the overflow discharge pipe also being connected to the main drain pipe to channel any overflow received thereby to the main drain pipe; and sensor means located on the overflow discharge pipe for providing early detection of the overflow from the tank by detecting overflow channeled through the overflow discharge pipe to the main drain pipe.

2. The system according to claim 1, wherein the overflow discharge pipe has an internal diameter smaller than an internal diameter of the main drain pipe.

3. The system according to claim 1, further comprising a controller for providing a signal whenever an overflow is detected within the overflow discharge pipe by the sensor means.

4. The system according to claim 3, further comprising alarm means connected to the controller for providing an alarm to an operator whenever an overflow is detected within the overflow discharge pipe by the sensor means.

5. The system according to claim 1, wherein the liquid or semi-liquid comprises a slurry.

6. The system according to claim 1, further comprising a source of liquid or semi-liquid connected to the tank, flow rate controller means for controlling a flow rate of liquid or semi-liquid from the source into the tank, and a controller for providing a signal to the flow rate controller means to reduce the flow rate of liquid or semi-liquid into the tank whenever an overflow is detected within the overflow discharge pipe by the sensor means.

* * * * *